March 10, 1970 A. E. FITZGERALD ET AL 3,499,501
STAIR CLIMBING APPARATUS
Filed May 22, 1967 3 Sheets-Sheet 1
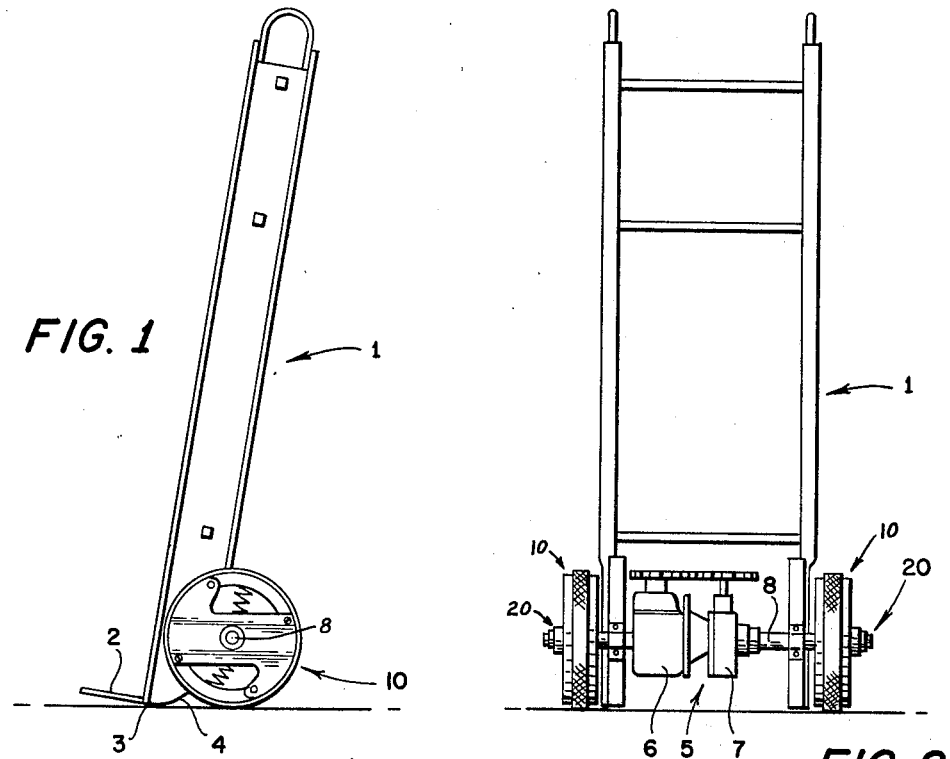
FIG. 1
FIG. 2
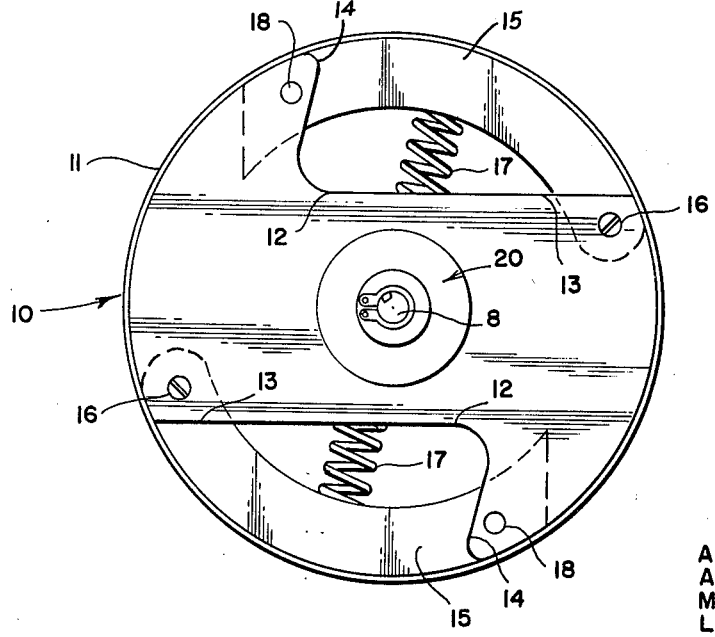
FIG. 3
INVENTORS
ARTHUR E. FITZGERALD
ARTHUR A. FITZGERALD
MICHAEL J. BAUER
LAWRENCE A. GECI
BY James C. Wray
ATTORNEY March 10, 1970　　A. E. FITZGERALD ET AL　　3,499,501
STAIR CLIMBING APPARATUS
Filed May 22, 1967　　3 Sheets-Sheet 2
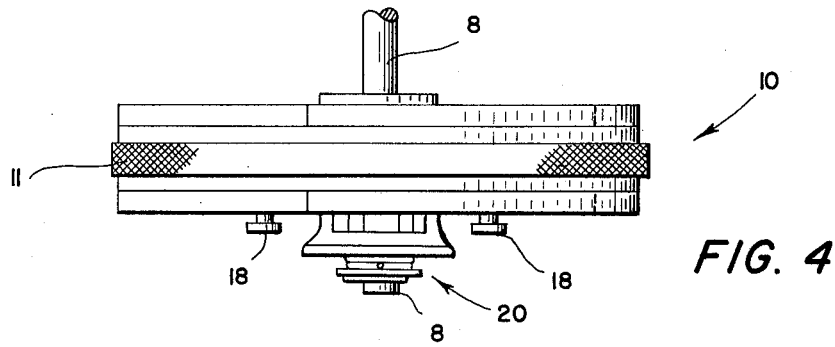
FIG. 4
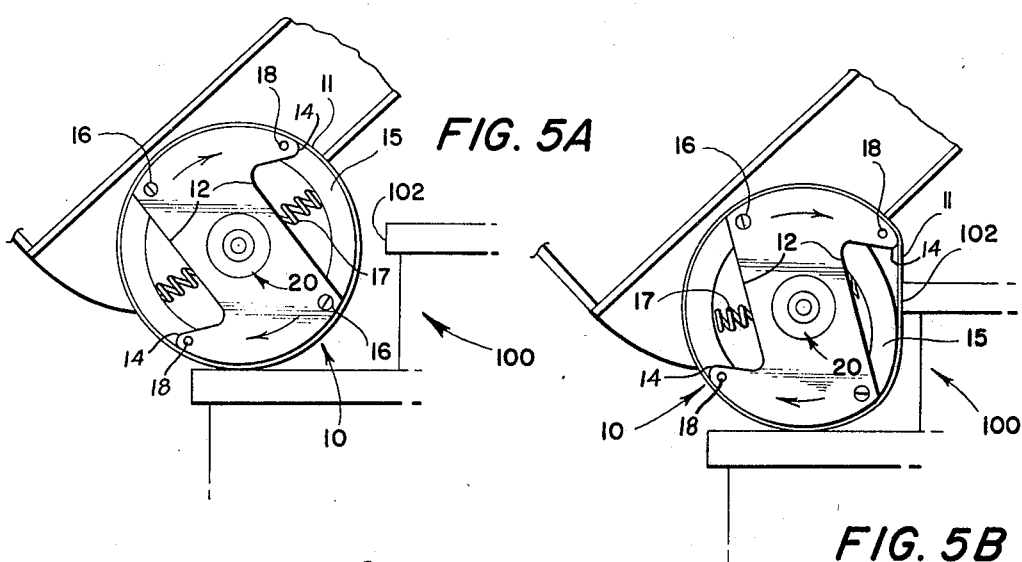
FIG. 5A
FIG. 5B
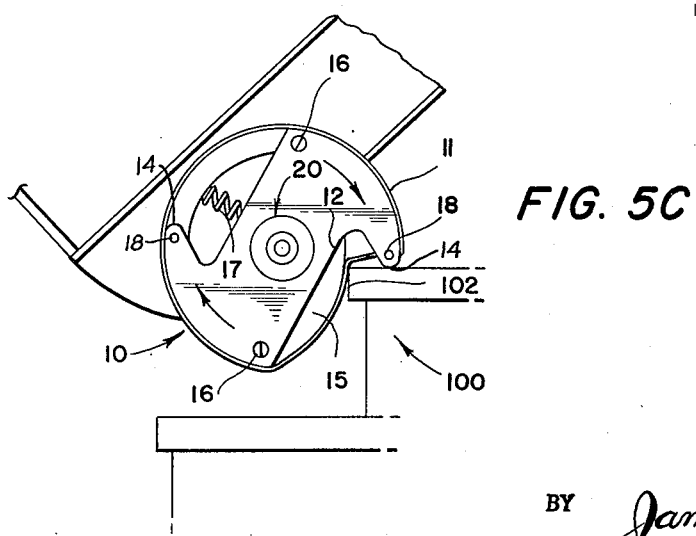
FIG. 5C
INVENTORS
ARTHUR E. FITZGERALD
ARTHUR A. FITZGERALD
MICHAEL J. BAUER
LAWRENCE A. GECI
BY James C. Wray
ATTORNEY March 10, 1970  A. E. FITZGERALD ET AL  3,499,501
STAIR CLIMBING APPARATUS Filed May 22, 1967  3 Sheets-Sheet 3

INVENTORS
ARTHUR E. FITZGERALD
ARTHUR A. FITZGERALD
MICHAEL J. BAUER
LAWRENCE A. GECI

BY James C. Wray
ATTORNEY

United States Patent Office 3,499,501
Patented Mar. 10, 1970

3,499,501
STAIR CLIMBING APPARATUS
Arthur Ernest Fitzgerald, McLean, Va., and Arthur A. Fitzgerald, Summerdale, Michael Joe Bauer, Theodore, and Lawrence Anton Geci, Mobile, Ala., assignors to Craft Corporation, Summerdale, Ala., a corporation of Alabama
Filed May 22, 1967, Ser. No. 640,176
Int. Cl. B62d 57/02; B62b 5/02, 9/02
U.S. Cl. 180—8                        10 Claims

ABSTRACT OF THE DISCLOSURE

Stair climbing wheels having peripheral step-engaging notches and having floor engaging belts or tires mounted on the periphery of the wheels for driving and sliding engagement with the wheels, notched stair climbing wheels having notch-closing means, and stair climbing wheels having reciprocable and extensible step-engaging bars, clutches having simplified engaging and disengaging means, and hand trucks having raised wheels and rounded lower extremities are described herein.

---

Historically, much attention has been given to research and development for stair climbing apparatus. Stair climbing wheels are useful on many types of vehicles, and most notably the climbing apparatus is useful on wheelchairs for transporting infirm persons and on hand trucks for carrying furniture, appliances and machinery.

As evidenced in existing patents, most of the development has occurred in vehicles for the transportation of infirm people, commonly known as wheelchairs; some development has also been recorded in the field of stair climbing hand trucks. However, most of the known apparatuses have drawbacks of expense, weight, complexity, cumbersomeness and unreliability which have precluded their widespread use. Consequently, a search is being continued for stair climbing wheels which meet normal requirements of weight, simplicity and reliability, and the existence of the continued quest is evidenced by the inclusion of stair climbing wheels in advertisements for inventions wanted by the United States Government.

The present invention meets the long-standing needs for satisfactory stair climbing wheels by providing reliable but uncomplicated apparatus. Envisioning that even in the guidance of man-carrying vehicles in climbing stairs, the dangers and consequences of falls on stairs are so serious as to require the use of an operator who does not ride the vehicle, the present invention is focused directly upon the stair-climbing apparatus per se, rather than guiding, tilting and balancing apparatus.

The broad objectives of this invention are accomplished by the use of notched stair climbing wheels having ledge or step-engaging edges which lift the wheels unto the next adjacent step. Tires or belts are mounted exteriorly on the wheels for engagement with the floor. The tires are attached to the wheels in a manner which permits a driving relationship between the tires and the wheels when moving over a flat surface until the wheels reach a vertical obstruction or stairway. Upon reaching an obstruction, the wheels continue to rotate within the tires until the notched portions of the wheels approach a lip of the obstruction or step. The belt and wheel continue to drive forward as the notch engages the step, forcing the notch into engagement with the step. As the wheel continues to rotate, the notch lifts the wheel and vehicle onto the next adjacent step. Upon mounting the step and abutting the next step, the wheels slip within the tires until the notches engage the edge of the next step, whereupon the climbing operation is repeated.

In a preferred embodiment of this invention, segmental means close the notches in the wheels to reduce or prevent bumping when the wheels roll over flat surfaces. The segmental members are pivotally mounted adjacent leading edges of the notches, considering the first or leading edges of the notch to be the edges which first approach the steps when wheels are turning in stair climbing directions. The segmental means are urged outwardly in continuation of the periphery of the wheels by springs, and outward travel of the segmental means is limited by stop means cooperating between second ends of the notches and the free ends of the segmental means. Associated with the stop means are locking means for fixing the segments in outer position when the wheels are rolled over long stretches of terrain.

Engagement and disengagement means or clutches lock the wheels to a shaft and driving means mounted on a vehicle when the wheels are moving in the stair climbing direction. For extended travel over flat surfaces the wheels and driving mechanism may be disengaged.

In a second embodiment of the invention, extensible means are mounted on the wheel to cooperate with the notches in lifting the wheel. The extensible portions comprise outward extending bars terminating in stair engaging shoes, which slide in and out of the wheel, and which are urged to the outward position by springs. In the climbing operation the shoes engage the stairs at the same time that the notches begin operation, and the shoes assist the notches in lifting the wheel onto the next step. As the extensible means approach the vertical position, the weight of the apparatus drives the bars and shoes back into the wheel, where they remain while related portions of the wheels are in contact with the stairs. As soon as those portions of the wheels move out of contact with the stairs, the extensible means slide outwardly, ready for the next climbing operation. Locking means hold the extensible means in withdrawn positions when the wheels are used on flat surfaces.

The invention has as its broad objective the provision of stair climbing wheels.

Another objective of this invention is the provision of notched stair climbing wheels.

This invention has as another objective the provision of notched stair climbing wheels having peripheral floor engaging belts mounted on the wheels for driving and sliding relationship with the wheels.

A further objective of this invention is the provision of notched stair climbing wheels having segmental notch-filling means.

This invention has a further objective in the provision of extensible stair climbing lugs and shoes for vehicular wheels.

This invention has as another objective the provision of novel engagement and disengagement means.

Another objective of this invention is the provision of hand trucks configured to facilitate the lifting of loads.

Further objectives of this invention will be apparent from the specification and from the drawings in which:

FIGURE 1 is a side elevation of a hand truck having stair climbing wheels;

FIGURE 2 is a rear elevation of a hand truck showing the interrelation of driving motor, gears, axle and stair climbing wheels and tires;

FIGURE 3 is an elevation of a stair climbing wheel and its associated clutch;

FIGURE 4 is a plan or edge view of the wheel shown in FIGURE 3;

Figure 6:
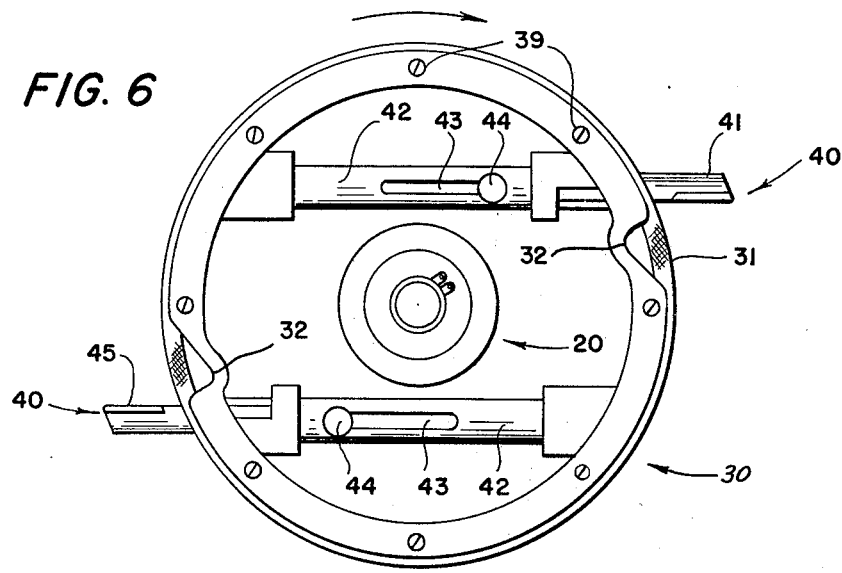
Figure 7:
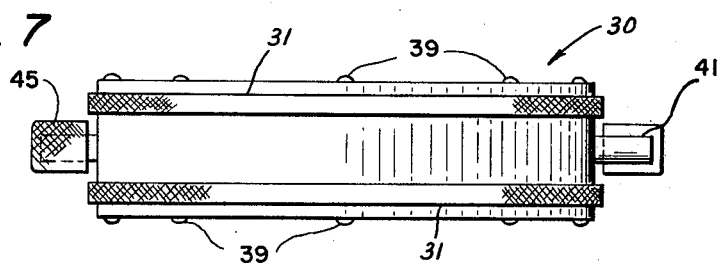
Figure 8:
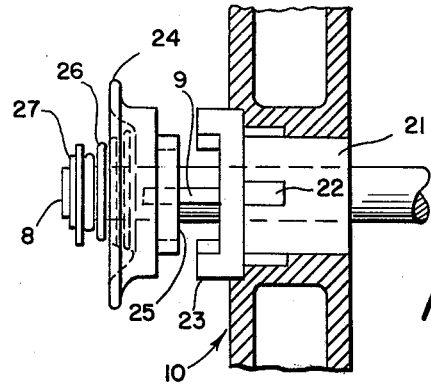

FIGURES 5A, B and C are representations of a wheel in a stair climbing operation;

FIGURE 6 is an elevation of an alternate form of stair climbing wheel;

FIGURE 7 is a plan view of the wheel shown in FIGURE 6;

FIGURE 8 is a side elevation of a clutch used with stair climbing wheels; and

Figure 9:
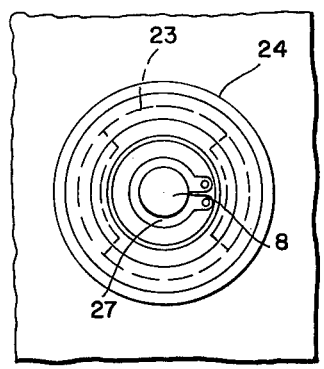

FIGURE 9 is an end elevation of the clutch in FIGURE 8.

Referring to the drawings, the numeral 1 generally indicates a hand truck having a step 2 for carrying appliances, furniture and other objects. Wheels 10 are supported on axle 8 which is displaced from the bottom of the hand truck so that the lower periphery of the wheels is above the lowermost point 3 of the hand truck when hand truck 1 is positioned with step 2 flat on a floor for loading or unloading an appliance. A curved surface 4 on the lower edge of the upright members of the hand truck cooperates with the raised wheels to allow the hand truck to be gently rocked back onto its wheels after an appliance has been loaded on step 2. Those features facilitate the picking up of a load after it has been mounted on hand trucks. Conventional hand trucks without raised wheels and curved lower surfaces require much more effort in tilting the loads up onto the wheels and in holding the wheels steady as the hand truck is tilted backward upon its wheels. Much less effort is required for tipping the hand truck of the present invention. The original fulcrum is at point 3 on rounded edge 4, and the fulcrum shifts rearwardly along the rounded edge until the weight of the load is dropped suddenly onto the wheels 10. There is no necessity to hold the wheels against rolling during that operation.

Apparent in FIGURE 2, the driving means 5 for the stair climbing wheels is seen to comprise a motor 6 connected by gears to a worm-drive reducer 7, which is in turn connected to shaft 8 to drive the wheels 10. Clutches 20 on both wheels may be unlocked and held in the disengaged position to allow free wheeling of the hand truck.

A preferred embodiment of a stair climbing wheel is shown in detail in FIGURES 3 and 4. Wheel 10 is rotatably mounted on shaft 8, and the wheel is fixed to shaft 8 by a clutch 20, later described in detail. A tire or belt 11 is loosely mounted upon the wheel so that the belt and wheel turn together until the wheel reaches a vertical obstruction; whereupon belt 11, being in engagement with the floor, stops turning; and wheel 10 continues to turn within belt 11. Wheel 10 further comprises a hub having notches 12 with first and second ends 13 and 14. Segmental means 15 are mounted on wheel 10 adjacent notches 12 in completion of the circumference of the wheel. The segmental means 15 are pivoted at bolts or pins 16, and they are urged in outward directions by springs 17 to complete the periphery of the wheel. The segmental means may be locked in their outward positions by locking pins 18, and stops are associated with pins to limit outward movement of the segmental means, whether the pins 18 are engaged or disengaged. As an example, inward projecting stops may be permanently affixed to the wheel at peripheral portions thereof adjacent second ends 14 of notches 12 near the pins 18. Before climbing stairs, pins 18 are drawn outward from holes in segments 15 as shown in FIGURE 4. When the wheels are configured for rolling across a flat surface, pins 18 are pushed inward into holes in segments 15.

FIGURES 5A, B and C illustrate sequential steps of wheel 10 in the stair climbing process. In FIGURES 5A and B, wheel 10 approaches and abuts stair 100. Being connected at 20 to power driven axle 8, wheel 10 continues to turn. Belt 11, being in contact with the stair, remains stationary; thus, wheel 10 turns within belt or tire 11, until a stair climbing notch comes into contact with ledge 102. Pin 18 has been withdrawn to unlock the segmental means 15. When the segmental means comes into contact with the vertical obstruction, segment 15 depresses against spring pressure as the wheel and tire continue to force the wheel against the edge of the stair. After the segmental means has been depressed, wheel 10 rotates edge 14 of notch 12 into contact with the next above step; and, as shown in FIGURE 5C, the continued rotation of the wheel lifts the wheel onto the next step. When the apparatus has been lifted, wheel 10 slips within belt 11 until the next notch is positioned for climbing the next adjacent stair.

In a second embodiment of a stair climbing wheel 30, as shown in FIGURES 6 and 7, notches 32 are assisted by lugs 40. In a manner similar to that discussed in the previous embodiment, tires 31 are loosely mounted upon the wheel 30 so that the tires rotate with the wheel until the tires and the wheel approach a vertical obstruction. At that point, being driven, wheel 30 continues to rotate, but being in engagement with the floor, tires 31 stop rotating so that the wheel slips within the tires. To insure the proper driving and slipping relationship between wheel 30 and belts 31, screws 39 may be tightened or loosened. As in well known conventional pulley rims, the rims are constructed of separate parts held together with screws 39. Tightening the screws draws the rims toward the belt, tightening the peripheral groove in which the belt moves.

The wheel operates much the same as the previous embodiment, with the exception that sliding bars 41 assist the climbing function of the wheel. Bars 41 are forced outwardly through the central portion of the wheel by springs located in cylindrical housings 42 on the wheel. Cylindrical housings 42 are provided with travel-limiting slots 43, which cooperate with stop bolts 44 to limit the travel of the bars 41. Stop bolts 44 are mounted in bars 41, and when the bars 41 are in the withdrawn position, turning the stop bolts tightly against housings 42 retains the bars within the wheel. The bars are further augmented in their stair climbing function by rounded shoes 45, which are welded to the exterior ends of the bars to assure that the bars do not score the stairs when climbing. Of course, shoes 45 are constructed sufficiently narrow to be recessed into the wheel between the parallel tires 31 when bars 41 are withdrawn.

In the stair climbing process wheel 30 moves in a clockwise direction, a shown in FIGURE 6. Stop screws 44 are released so that the bars freely may move outwardly. The wheels and tires move together, and since the reciprocal bars are offset from a radial position, they are automatically depressed into when moving across a level surface. When a vertical obstruction is reached, wheels 30 continue to rotate within tires 31 until notches 32 and bars 40 come into contact with the next above stair.

By continual rotation of the wheel, the bar means 40 and the notch 32 lift the wheel onto the stair. As bar 40 reaches a vertical position, it is forced back into its cylindrical housing by the weight of the vehicle. Then the wheel continues to move as a unit until the next vertical obstruction is reached, whereupon the wheel slips within the tire. As the wheel continues to rotate, the bar and shoe are rotated out of contact with the stair, and the spring pressure again urges bar 40 outward, readying it for the next climbing operation.

A preferred form of clutch 20 is illustrated in FIGURES 8 and 9. A first portion of clutch 20 comprises a cylindrical cast iron insert 21 about which wheel 10 has been cast. Lugs 22 prevent relative rotation of insert 21 and wheel 10. Insert 21 has an on its outward face segmental clutch elements or teeth 23. Since wheel 10 rotates freely on axle 8 wheel elements of the clutch are disengaged, insert 21 is a bearing. Because of its porosity and oil retaining properties, cast iron is an excellent bearing material for insert 21.

The second portion of clutch 20 is an annular element 24 which slides axially along axle 8. Moveable portion 24 has on its inner face teeth 25, which complement and cooperate with the teeth 23 on the first portion of the clutch. Conical spring 26, which is anchored by retainer 27 on the outer end of the shaft 8, urges the sliding element 24 into engagement with the clutch element 21. Standard ⅜₁₆ inch key 9 is fixed to shaft 8, and the end of the key 9 is spaced at a distance from the end of shaft 8.

A ⅜₁₆ inch keyway in the slidable clutch element engages key 9 and insures that the outer clutch element 24 rotates with shaft 8. Pulling element 24 outward against the spring pressure slides the keyway along key 9 until the keyway is out of engagement with the key. Thereupon a slight twisting of the outer clutch element locks the clutch in its outward disengaged position. Wheels 10 are then free to rotate about shaft 8. The wheels are locked to the shaft with the engaging mechanism just before stairs are climbed.

We claim:

1. Stair climbing apparatus comprising a frame, at least one device mounted for rotation on the frame, said device having a periphery and having at least one notch in said periphery, means connected to the frame for rotating the device, and at least one floor-engaging belt slideably mounted on an exterior of the device and spanning the at least one notch, whereby said device slips within said belt until said notch engages a step.

2. Stair climbing apparatus comprising a frame, at least one device mounted for rotation on a frame, said device having a periphery and having at least one notch in said periphery, means connected to the frame for rotating the device, at least one extension means mounted on said device for reciprocation adjacent the at least one notch, said extension means comprising a pin, a housing fixed to said device and slideably mounting said pin, spring means within said housing urging said pin out of said housing, stop means limiting outward travel of said pin, and detent means associated with said housing and with said pin for locking said pin in said housing against pressure of said spring means.

3. Stair climbing apparatus comprising a frame, at least one wheel mounted for rotation on said frame, means for rotating said wheel with respect to said frame, extensible stair-engaging parallel bars associated with the wheel and uniformly spaced from a center of the wheel and extensible in opposite senses of direction, housing means mounted on the wheel for receiving the extensible bars, resilient means attached to the housing means urging the extensible bars out of the housing means, and limit means associated with the housing means for limiting outward movement of the extensible bars.

4. Stair climbing apparatus comprising a frame, at least one wheel mounted for rotation on the frame, means connected to the frame and to the wheel for rotating the wheel with respect to the frame, said wheel having a periphery and having at least one notch in said periphery, segment means pivotally mounted on said wheel adjacent an intersection of the periphery and the notch and spanning the notch in continuation of the periphery, spring means connected to the wheel and to the segment means for urging the segment means radially outward from a center of the wheel about a pivot, stop means connected to the wheel adjacent another intersection of the notch and periphery, said stop means preventing outward movement of the segment means beyond a position in which the segment means completes the periphery of the wheel, and lock means mounted in the wheel adjacent the second stated intersection of the notch and periphery, the lock means being associated with the stop means for movement between first and second positions respectively wherein the lock means engages the segment means for preventing inward movement of the segment means and wherein the lock means releases the segment means for inward movement about the pivot.

5. The stair climbing apparatus of claim 4 further comprising at least one floor-engaging belt slideably mounted on an exterior of the wheel and spanning the at least one notch, whereby upon reaching an obstruction, said wheel slips within said belt until said notch engages a step.

6. Vehicular apparatus comprising a frame, at least one device mounted for rotation on said frame, means to rotate said device relative to said frame, at least one floor-engaging flexible element slideably mounted exteriorly on said device for movement with said device when said device and said frame are moving over a generally planar floor and for sliding upon said device and for remaining fixed with respect to a floor when said device continues to rotate after having engaged a vertical obstruction.

7. The vehicular apparatus of claim 6 wherein the device comprises a wheel having at least one notch in a periphery thereof, and wherein the flexible element comprises a tire surrounding the periphery and extending outward therefrom, whereby said wheel slips within the tire after having reached an obstruction until the notch engages the obstruction.

8. Stair climbing apparatus comprising a frame, at least one wheel mounted for rotation on the frame, means connected to the frame and to the wheel for rotating the wheel with respect to the frame, said wheel having a periphery and having at least one peripheral notch, the notch having a leading edge on the periphery of the wheel, which leading edge first approaches a stair as the wheel and frame are turning and moving toward the stair, and the notch having a second edge which engages a horizontal surface of a stair and which lifts the wheel and frame on the stair as the wheel continues to rotate, spring means connected to the wheel adjacent the notch and movable stair-engaging means connected to the wheel adjacent the notch and connected to the spring means whereby the spring means urges the movable stair-engaging means outward with respect to the center of the wheel and lock means connected to the wheel and to the movable stair-engaging means for selectively holding the movable stair-engaging means fast to the wheel to prevent relative movement thereof and for releasing the movable stair-engaging means for relative movement with respect to the wheel.

9. The stair climbing apparatus of claim 8 wherein the movable stair-engaging means comprises at least one bar having an axis offset from a center of the wheel and extensible beyond the periphery of the wheel adjacent the second edge of the notch for cooperating with the second edge of the notch to lift the wheel on a stair as the wheel continues to rotate and to return into the wheel against spring pressure when the bar becomes perpendicular with a horizontal surface of the stair.

10. The stair climbing apparatus of claim 8 wherein the movable stair-engaging means comprises a segment means pivoted at a first end to a pin mounted in the wheel adjacent the leading edge of the notch, a stop means and a lock means mounted in the wheel adjacent the second edge of the notch, the stop means and the lock means cooperating with a second end of the segment means and respectively preventing outward movement of the segment means beyond a periphery of the wheel and preventing inward movement of the segment means when the lock means is engaged with the segment means.

(References on following page)

References Cited

UNITED STATES PATENTS

| | | | |
|---|---|---|---|
| 2,400,824 | 5/1946 | Jackson | 280—5.26 X |
| 2,633,363 | 3/1953 | Marshall | 280—5.26 |
| 2,742,973 | 4/1956 | Johannesen. | |
| 2,874,814 | 2/1959 | Beck | 287—53 |
| 2,931,449 | 4/1960 | King. | |
| 3,050,321 | 8/1962 | Howe et al. | 287—53 |
| 3,178,193 | 4/1965 | Grogan | 280—5.26 |
| 3,179,431 | 4/1965 | Pikl | 280—5.2 |
| 3,226,128 | 12/1965 | Grier | 280—5.2 |
| 3,227,465 | 1/1966 | Massie | 280—5.2 |

FOREIGN PATENTS

| | | |
|---|---|---|
| 574,648 | 3/1958 | Italy. |

LEO FRIAGLIA, Primary Examiner

U.S. Cl. X.R.

280—5.2, 5.26; 287—53; 301—1